March 5, 1963  P. V. LARSEN ET AL  3,079,710
GROUND-WORKING TOOTH AND METHOD
Filed June 22, 1961  3 Sheets-Sheet 3
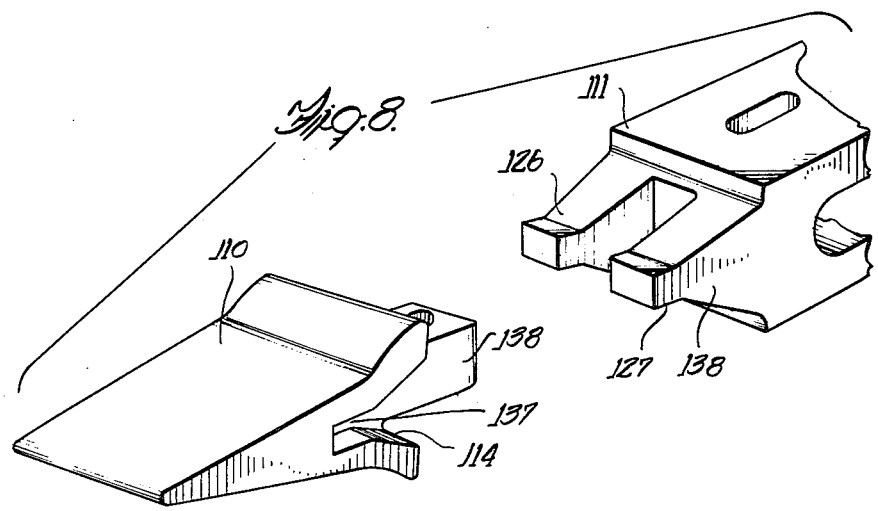
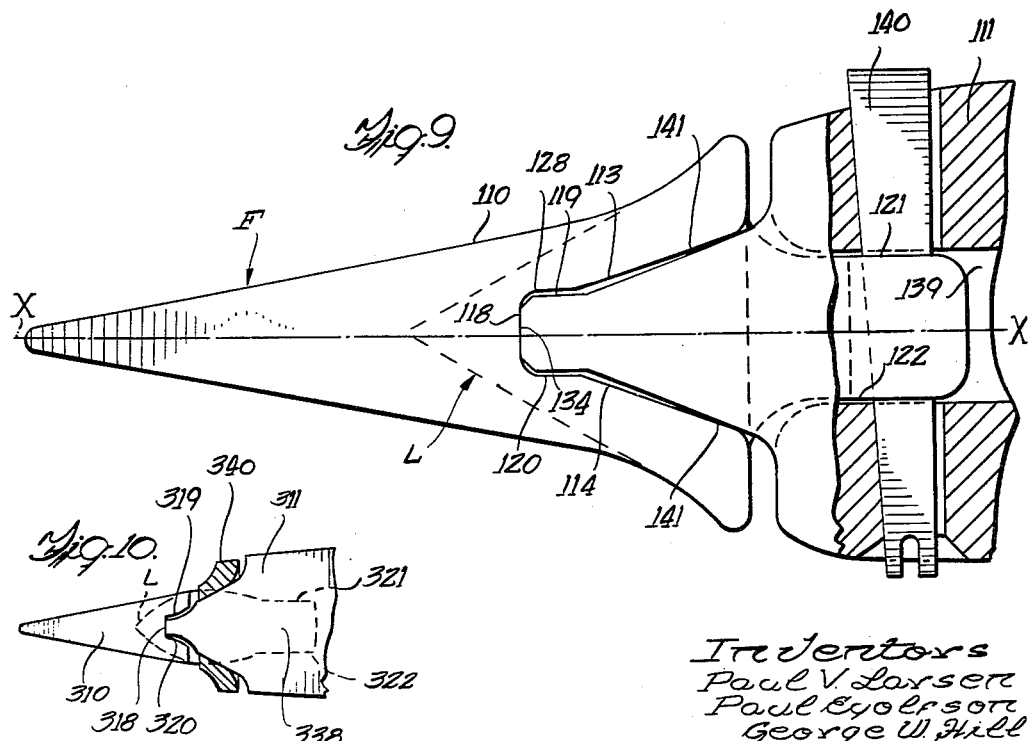
Inventors
Paul V. Larsen
Paul Eyolfson
George W. Hill
Eugene W. Dils, Jr.
Dawson, Tilton, Fallon & Lungmus
Attorneys United States Patent Office 3,079,710
Patented Mar. 5, 1963

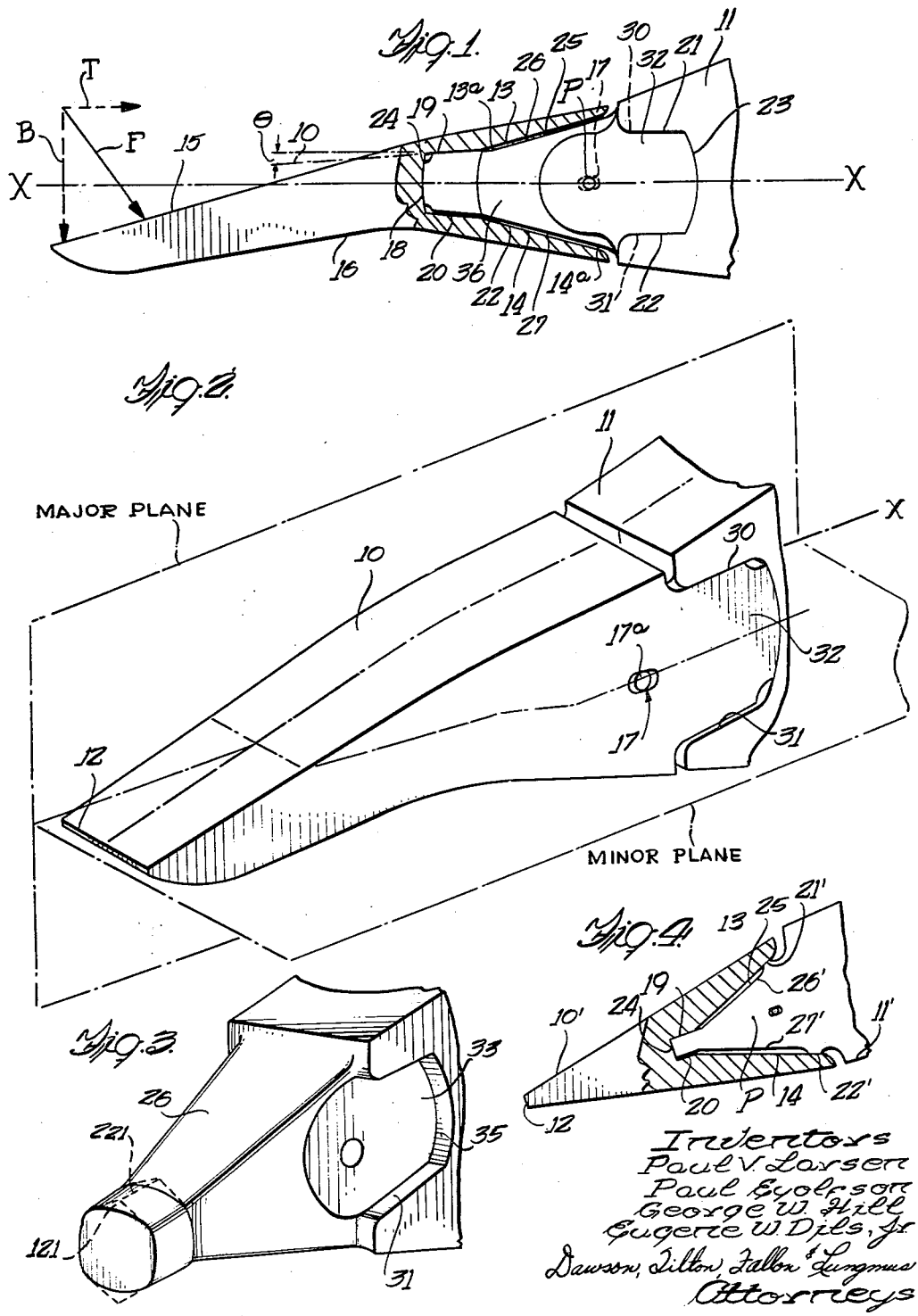

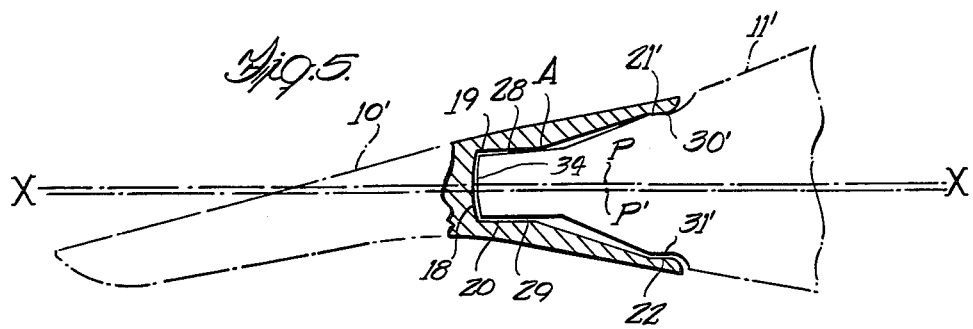
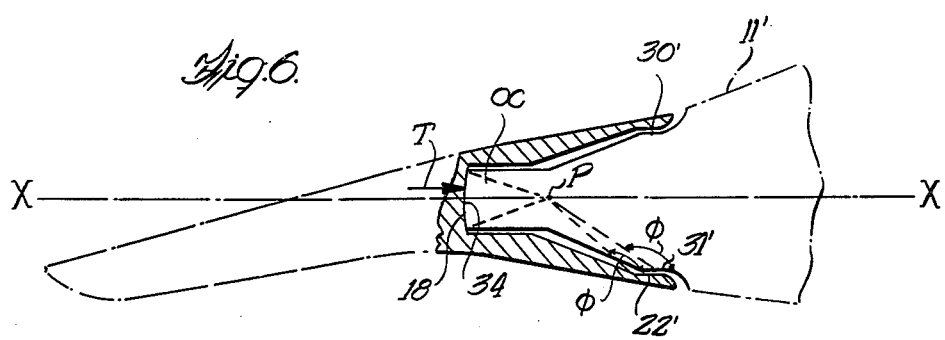
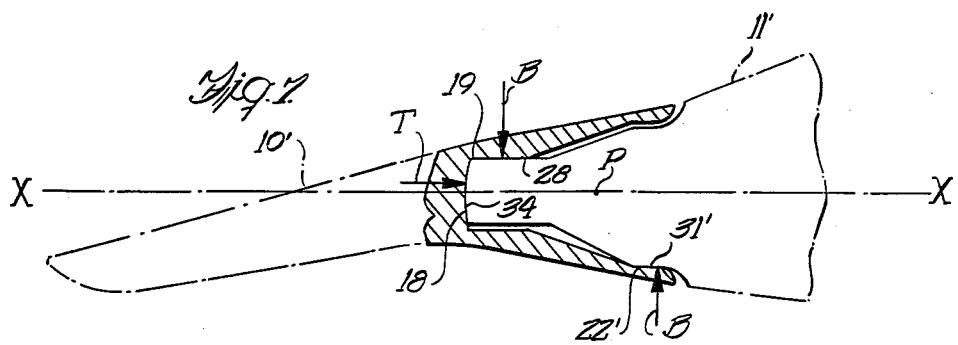

3,079,710
GROUND-WORKING TOOTH AND METHOD
Paul V. Larsen and Paul Eyolfson, Portland, George W. Hill, Newburg, and Eugene W. Dils, Jr., Portland, Oreg., assignors to Esco Corporation, Portland, Oreg., a corporation of Oregon
Filed June 22, 1961, Ser. No. 118,930
11 Claims. (Cl. 37—142)

This invention relates to a ground-working tooth, and, more particularly, to a tooth point adapted for mounting on tooth holders for use on excavating equipment, and the manufacture thereof.

This application is a continuation-in-part of our co-pending applications Serial No. 855,713, filed November 27, 1959, now Patent No. 3,026,947, and Ser. No. 50,655, filed August 19, 1960, now abandoned.

It is an object of this invention to provide a tooth structure and method of manufacture thereof wherein novel bearing surfaces are provided which are effective to resist the tendency of the tooth elements to become dissociated, the surfaces being arranged to separately receive and transmit force quadrature components as contrasted to the previously provided bearing surfaces which were subjected to the unresolved force and thereby required close fits and supplemental locking means. In contrast to this, the invention contemplates actual rocking of the tooth point on the tooth holder as stresses change. Other objects and advantages of this invention may be seen in the details of construction and operation set forth herein.

The invention will be explained in conjunction with the accompanying drawing, in which—

FIG. 1 is a fragmentary elevational view, partially in section, of a tooth embodying teachings of the invention;

FIG. 2 is a fragmentary perspective view of the FIG. 1 tooth with additional schematic reference indicia for explaining the operation of the tooth;

FIG. 3 is a fragmentary perspective view of a tooth holder element employable in the tooth structure of FIGS. 1 and 2 and showing a modification thereof in dotted line;

FIG. 4 is a fragmentary elevational view, partially in section, of a modified form of tooth;

FIGS. 5–7 are fragmentary elevational views of the tooth of FIG. 4 showing the condition of the tooth elements under different stresses;

FIG. 8 is an exploded fragmentary perspective view of yet another form of tooth which also embodies the invention;

FIG. 9 is a fragmentary elevational view, partially in section, of the tooth of FIG. 8; and FIG. 10 is a fragmentary elevational view, partially in section, of a modified form of tooth, similar to that of FIGS. 8 and 9.

Reference to the drawing, particularly FIGS. 1 and 2, reveals that the tooth includes, as component elements, a point 10 and a point holder 11.

The tooth point is an instrument having direct contact with the worked material, i.e., ground, rock, etc., for penetration, lifting, pushing, or casting aside of the material to be excavated or relocated. The point 10 may take the form of a blade, pick, or a scoop. The exterior form of the tooth point may or may not be symmetrical about a reference axis X—X; compare, for example, FIGS. 1 and 9.

The tooth holder 11 is an element matable with the tooth point 10 and may be provided as an integral portion or removable part of a piece of excavating equipment. In any event, the tooth point 10 and tooth holder 11 are releasably joined, and the joinder is accomplished by moving the tooth point 10 along a path corresponding to the reference axis X—X. Ordinarily, a force is applied along this line to drive the tooth point onto or into the tooth holder, or to remove the tooth point from the tooth holder, without the introduction of bending moments.

The working stresses to which the tooth is subjected ordinarily will include bending moments, a typical stress or force to which the tooth is subjected being designated by the symbol F in FIG. 1. The force F is resolvable into quadrature components T and B. The force component T represents thrust, which acts along the reference axis and, depending upon its direction, tends to either drive the tooth point onto, or remove the tooth point from, the tooth holder.

The quadrature component B is the one producing the bending moments and acts in a direction perpendicular to the reference axis X—X.

The power applied by the excavating equipment is usually directed in an orderly path, which will fall in what we have chosen to designate the major plane (see FIG. 2), which is a plane passing longitudinally through the reference axis X—X of the tooth point 10 and tooth holder 11. Thus, the major plane will be vertical when the tip or digging edge 12 of the point 10 (see FIG. 2) is disposed parallel to the ground (i.e., horizontally). Illustrative of this is the fact that dragline buckets, rippers, scarifiers, or scrapers are intended to exert a force in what might be referred to as a straight line in the major plane. Trencher wheels, shovel dippers, hole dippers, excavating wheels, cutter heads, and similar equipment are intended to follow a generally circular or curved path in the major plane. However, all of the above equipment may also be subject to a lateral sweeping motion, purposely or accidentally applied, generating force components in the minor plane (see FIG. 2 again), the minor plane also passing through the reference axis but being disposed perpendicularly to the major plane.

Conventional teeth employ wedge faces (corresponding to those designated 13 and 14 in FIG. 1) as primary bearing surfaces to resist forces in the major plane. Ordinarily, these wedge faces are angularly inclined, having an included angle of from 28° to 36°. These wedge faces, along with the outer surfaces 15 and 16 of the point 10, provide a forwardly converging wedge shape for the purpose of accommodating both the sharpness of the cutting edge 12 and the maintenance of adequate beam strength in the tooth holder 11. It is thus seen that the wedge faces of conventional teeth, in providing the primary bearing surfaces, are required to absorb both the thrust and beam components of any force F. In the past, uniform loading of the primary bearing surfaces 13 and 14 was accomplished only with a pure thrust force ($F=T$), such as would be achieved in direct penetration of the worked material.

When power is applied to lift or cast aside material, beam forces are generated in addition to the thrust force. Under certain conditions of shock loading or lifting upwards of an impacted object, a pure beam loading ($F=B$) will be encountered. Under such conditions, in a conventional tooth using wedge faces, the bearing loads concentrate near the extreme forward edge of one primary bearing surface and near the extreme rearward edge of the opposite primary bearing surface (as at 13a and 14a). This leads to extremely high bearing load concentrations which often cause deformation of the bearing surface. This condition is aggravated as looseness develops in the assembly as a result of wear.

In a conventional wedge-faced tooth under pure beam loading, a negative thrust force is generated, i.e., the thrust component acts in a direction opposite to that shown in FIG. 1. For example, the negative thrust force ($-T$)

developed on angular primary bearing surfaces having an included angle of 30°, will reach a value of approximately 78% of the externally applied beam force at the tip of the tooth where the ratio of the length of the tooth to the bearing span is approximately 2:1. Under this condition, it has been necessary in the past to employ an accurately fitted key lock (corresponding to the pin and aligned aperture elements generally designated 17 in FIG. 2) in order to avoid ejection of the point from the tooth holder. The key lock structure 17 in the past was characterized by a high shear and bearing strength to provide an artificial positive thrust at installation, rigidly binding the bearing surfaces of the point 10 and tooth holder 11 to one another in order to take advantage of static friction resistance. Under dry conditions, the coefficient for static friction of steel on steel falls in the approximate range of 0.39 to 0.43. Thus, the frictional resistance under the above-described ideal static and well-fitted conditions will almost exactly equal the negative thrust generated under pure beam loading at the tip of a tooth point with the 2:1 tooth length ratio. When looseness is encountered because of wear or because of failure of the key to remain rigidly in place, the ideal static friction resistance becomes substantially unreliable. Under sudden loading, sliding friction usually prevails and the coefficient of sliding friction may expect to drop to a value as low as 0.28, and under shock conditions this value may drop even lower and the tooth elements separate. To prevent this, more and more accurate fits between elements were demanded, along with supplemental locking arrangements.

More specifically, the conventional tooth employing wedge faces as bearing surfaces is subject to certain critical limitations: (1) the tooth length to bearing span ratio is limited to approximately 2:1; (2) the fit between the mating bearing surfaces of the tooth point and tooth holder are subject to quite critical manufacturing tolerances; and (3) the key lock is subject to critical manufacturing and installation tolerances.

It is to be noted that some designers have recognized these limitations and have attempted to compensate for the looseness which develops in service through other means of stabilization by the use of secondary bearing surfaces such as shelves and ledges, which will act to stop complete ejection of the tooth, but only after the primary bearing surfaces have become disengaged. Although such secondary means of stabilization provide some benefit, it cannot avoid concentration of bearing stresses at the extreme edges of both primary and secondary bearing surfaces. Such stress concentration will accelerate wear and loosening of the assembly, and will lead to complex internal stresses in the internal tooth structure, often leading to breakage. As a result, both the tooth point structure and the tooth holder must be overdesigned for breaking strength and bearing area.

The foregoing difficulties are avoided in the inventive construction. In this construction, peak loading stresses are reduced to a minimum, eliminating the need for overdesign. Manufacturing tolerances are much less critical, generated negative thrust forces are eliminated, or, at the choice of the designer, may be permitted to exist to a limited degree which can be readily resisted by the coefficient of sliding friction. In the inventive construction, this is achieved through the separation of the bearing surface functions. Separate surfaces are provided for thrust bearing (i.e., the surfaces which transmit the force component T) and for the beam component B. At least one thrust bearing surface 18 (see FIG. 1) is provided to oppose positive thrust T substantially completely independent of the function of the beam bearing surfaces or land areas 19, 20, 21 and 22 (also see FIG. 1). From this, it will be seen that the thrust bearing surface 18 can take the entire load of a pure thrust force. Further, the thrust bearing surface, and cumulatively or alternatively, the surface 23, is arranged so that it will not oppose rotary movement of the tooth point 10 about a reference pivot point P. The point P can be considered a theoretical point at any location along the reference axis X—X within the length bounded by the physical positions of the several thrust and beam bearing surfaces. In FIG. 1, the pivot point P is seen to fall within the confines of the lock structure 17—in FIG. 4 the theoretical pivot point P lies forwardly of the lock structure 17.

The relation between the thrust bearing surface or surfaces 18 or 23, as the case may be, to the beam bearing surfaces 19—22 (the surfaces 18, 19 and 20 defining the apex 24 of the socket 25 of tooth point 10), is such that the intermediate structures 13 and 14 between the forward and rearward coacting beam bearing surfaces do not engage the counterpart structure 26 and 27 on the tooth holder 11, particularly in the area immediately adjacent the forward beam bearing surfaces 19 and 20.

The box-shaped apex of the socket 25 may extend over twenty-five percent of the effective bearing length of the point relative to the socket; i.e., twenty-five percent of the length of the nose portion of the holder 11. The provision of the box apex has been found to provide sufficient resistance to shear stresses so that the previous tooth length limitation (2:1) can be exceeded. Shear failure of the nose portion occurs preferentially to bending moment failure in conventional teeth. Thus, the surfaces 19 and 20 are spaced apart and arranged in bearing area to preclude this shear failure.

In FIG. 4, a modified version of the tooth structure is seen, the tooth point being equipped with upper and lower beam bearing surfaces 19 and 20 at the apex 24 of the socket 25 of the point 10'. The socket 25 extends inwardly into the tooth point 10' from the end thereof opposite the end equipped with the cutting edge 12. The extreme outward portion of the socket 25 is equipped with the rearward beam bearing surfaces 21' and 22'. Intermediate the beam surfaces 19 and 21' and 20 and 22', the usual wedge faces 13 and 14 are seen to be spaced from their counterparts 26' and 27' on the tooth holder 11'.

The tooth structure of FIG. 4 is shown in various operative conditions in FIGS. 5–7, which in effect represent phantom cross sections through the major plane. In FIG. 5, the tooth is not under stress, so the various bearing surfaces need not be in alignment. For example, the upper forward beam bearing surface 19 of the tooth point 10' is not aligned with the upper forward beam bearing surface 28 of the tooth holder 11'. The corresponding lower forward beam bearing surfaces 20 and 29 are similarly out of alignment. The same applies to the rear upper beam bearing surfaces 21' and 30' and to the lower rear beam bearing surfaces 22' and 31' (see also FIG. 2). The construction seen in FIGS. 1–3 differs from that seen in FIGS. 4–7 in that the tooth point 10' is equipped with a rearwardly-extending tongue or ear 32 on each side thereof which fits within a corresponding recess 33 on the tooth holder 11' and it is these tongues that are equipped with the thrust bearing surfaces 23. Also in FIG. 5, the thrust surface 18 is not in contact with the corresponding thrust surface 34 on the holder 11'.

With the element assembly at rest as seen in FIG. 5, and a downward beam bending force B applied (as in FIG. 1), the tooth point 10' rocks or pivots downwardly on the tooth holder 11' about the point A (see FIG. 5) to align the reference pivot P' of the tooth holder with the pivot P of the point and thus bring the two axes (FIG. 5) also into alignment, resulting in the bearing contact as illustrated in FIG. 7. In FIG. 7, it will be seen that the surfaces 19 and 28 are in contact, as are the surfaces 22' and 31'. The thrust bearing surfaces 18 (of the point 10') and 34 (of the holder 11') are also in contact, as they are in FIG. 6, which illustrates a condition under a pure thrust load T, with all beam bearing surfaces spaced apart from each other and making no contact.

The thrust bearing surfaces 18 and 23 of the tooth point 10 or 10', as the case may be, and 34 and 35 of the tooth holder 11 (surface 35 being seen only in the embodiment seen in FIGS. 1–3 and constituting an arcuate length of about 60°) preferably are surfaces of revolution about the reference pivot point P, i.e., a transverse axis passing through the reference pivot point. However, if the surfaces 18 and 23 are contained within an included angle of about 20°, designated α (alpha) in FIG. 6, related to the reference pivot point with the thrust bearing area centered about the reference axis, a plane surface may be substituted for a surface of revolution. The plane surface will, upon use, develop into the desirable surface of revolution due to the rocking action of the point on the adapter.

Alternatively or cumulatively, the surface 36 of FIG. 1 may be employed as a thrust bearing surface. This also is a surface of revolution, such as a conical section or spherical section of about 90° of arc developed about an axis passing through the pivot point, and may partake of the form described in greater detail in the first above-mentioned copending application. When a surface of revolution of this character is employed as a thrust bearing surface, the principal resistance to thrust will be developed along the central portion of the surface 36 and being transmitted thereto by a counterpart surface (not shown) on the interior of point 10.

The forward surfaces of each coacting pair of beam bearing surfaces are preferably made parallel to the reference axis. Thus, the surfaces 19 and 28 are parallel to the reference axis X—X. Since true parallelism is not easily accomplished, satisfactory operation is achieved when a slight forward convergence is employed, i.e., of the order of less than about 5° relative to the reference axis. This is illustrated by the angle θ in FIG. 1, and within this small limitation it is possible to achieve substantial benefit of the invention while still providing manufacturing clearances to allow for the desirable radial movement of the tooth 10 on the holder 11 during the imposition of the force F.

The rearward surfaces of each coacting pair, i.e., 22 and 31 or 21 and 30, are also preferably made parallel to the forward surfaces of the same coacting pair. As can be appreciated from a consideration of FIG. 7, the lower rearward bearing surfaces coact when the upper forward bearing surfaces coact. Again, due allowance may be made for manufacturing clearances, the rearward surfaces may be also forwardly convergent relative to the forward surface of the same coacting pair. We have found that it is desirable to limit the forward convergence of the rear surfaces to an angle of about 15°.

For simplicity of manufacture, both the forward and rearward beam bearing surfaces are ideally made as plane surfaces. However, these surfaces may be varied widely to suit the purposes of a given design. The angular limitations described above still apply to the effective average inclination of an irregular or curved beam bearing surface. The effective average inclination is defined by a plane tangential to the surface at the point of maximum load concentration. Thus, the upper forward beam bearing surface may assume a cylindrical form as at 121 in FIG. 3, or a roof shape as designated by the dotted line configuration marked 221 in FIG. 3. This roof shape is essentially a cylindrical segment when the broad definition of a cylinder is regarded, and further functions effectively in the practice of the invention.

The conventionally-employed locking pins or like devices may be placed in a variety of locations within the assembly (compare the structure 17 of FIGS. 1 and 4), provided that the structure 17 does not interfere with the planned functions of the thrust and beam bearing surfaces. When placed in a position which might cause interference, it is quite satisfactory to simply insure that they are flexibly or loosely mounted. If side surfaces of revolution such as that designated 36 are employed, it will be apparent that the shape of the surface controls the center of rotation rather than the pin or other locking device. The pin portion 17a of the locking structure 17 may be movable to some extent in one or more directions, and need not be on the axis of the surfaces of revolution, nor need it even be parallel to such an axis. If the pin permits relative movement about the axis of the surfaces of revolution, the pin can even be perpendicular to the axis. Thus, the locking pin structure is truly an adjunct to the primary securement or mounting of the tooth point 10 on the holder 11.

The benefit of the invention can be achieved with other types of tooth point and holder constructions, i.e., the form, for example, seen in FIGS. 8 and 9. There, a tooth 110 is seen to be equipped with side recesses 137, while the tooth holder 111 is equipped with spaced-apart horns 138. The recesses 137 are equivalent to the socket 25 found in the embodiments of the invention set forth in FIGS. 1–7—more specifically, each recess 137 defines half a socket. The recess 139 in the holder 111 also can be considered a recess. The tooth point 110 is equipped with a rearwardly-extending tongue or shank 138 fitting within the recess 139 within the holder 111 and secured therein by means of a transverse pin 140. In the construction seen in FIGS. 8 and 9, the action under a load is similar to that in the embodiments in FIGS. 1–7. With a force applied such as is designated F in FIG. 9, the forward beam bearing surfaces 119 and 128 serve as fulcrum for the load during the attendant pivoting action. The fulcrum here is more precisely the support for the maximum moment in the tooth point of the applied beam load in the static condition of the parts after all lost motion about the reference pivot point has been taken up. This is in distinction to the reference pivot point P which is not involved in the loading but is merely the center of rotation during the lost motion movement before the parts actually assume the applied load.

In the embodiment seen in FIGS. 8 and 9, it may be advantageous to provide a secondary bearing as at 141 for assisting the surfaces 119 and 122 or 120 and 121 in transmitting the force of the beam component. However, it is important to note that the surfaces 113 and 114 immediately outward of the surfaces 119 and 120 are spaced from the corresponding surfaces on the horns 138, these surfaces being designated 126 and 127 in FIG. 8. In one aspect of the invention, this can be achieved by having the usual wedge surfaces of the point and holder extend out of parallelism, i.e., being convergent either rearwardly or forwardly, as desired. Also, the point 110 and adapter 111 may be equipped with surfaces of revolution on the sides thereof, analogous to surface 36 of FIG. 1, to absorb thrust.

In operation, the tooth point (10, 10' or 110) actually "rocks" on the holder (correspondingly numbered 11, 11' or 111), with changing the force F. This rocking or pivoting occurs about the pivot point P which, as pointed out before, is a theoretical point on the reference axis X—X within the confines of the several thrust and bearing surfaces. Radii from this point P to corresponding bearing surfaces, i.e., 19 and 28, 20 and 29, 21 and 30, 22 and 31, 18 and 34, form the same angles with the bearing surfaces in each pair, i.e., the two angles φ in FIG. 6. The surfaces of opposite pairs rotate into parallelism depending on the character of the force F, more particularly the beam component B. With component B of the direction shown, surface 19 mates with surface 28 and 31 with 22. With the beam component (−B), the corresponding opposed pairs include 20 and 29 and 30 and 21.

The theoretical pivot (designated P) alternatively can be defined as an axis perpendicular to the reference axis X—X, or axis of loading, and also perpendicular to the direction of the beam component, rays from this pivot axis forming equal angles with corresponding beam bearing surfaces on the point and adapter when connected with corresponding points on those surfaces. Further, when one pair of beam bearing surfaces are in parallel contacting relation, i.e., 19 and 28, the other similarly longitudinally oriented pair, i.e., 20 and 29, must be out of contact and out of parallelism.

Thus, it will be seen from the foregoing that there is a virtual elimination of the negative thrust generated by forces producing bending or beam moments. Further, there is a uniform loading of the beam bearing surfaces and, since no single surface is required to transmit both beam and thrust components, the total load on the beam bearing surfaces will be reduced by the thrust component. This reduction of load on the forward beam bearing surface can be appreciable under the usual service conditions. With the separation of the thrust and beam bearing surfaces, the forward and rearward beam bearing surfaces and the approximate parallelism of the forward beam bearing surfaces and reference axis, we by-pass the preoccupation of the prior art workers with close tolerance and supplemental locking devices. In the prior art structures, any shift of the point relative to the holder resulted in a radical change in the bearing connection. This maximized the importance of a tight fit and notwithstanding extensive work on this, the tight fit usually was dissipated shortly after the tooth was placed in operation. Irrespective of the fit, any shift of the two tooth elements relative to each other in the prior art constructions, transformed a desirable surface bearing into an undesirable point or line bearing. Once this shift of bearing occurred, the bearing between the confronting portions on the two elements became subject to working or distortion by concentrations of stress. Even where premature failure would not occur as a result of this working, the distortion proved almost as unsatisfactory, since it rendered the elements unsuitable for replacement. Conventionally, points are removed from time to time for replacement with other points designed for different digging conditions, resharpening, and the like, and this was done with considerably more facility than removing the holder from the main frame of the digging equipment. Substantial distortion of the mating surfaces of either of these elements precluded the selective replacement of one of them. Should the holder be substantially deformed, the operator, in attempting to replace the point, finds a major overhaul facing him, since the holder itself must also be removed.

Notwithstanding the undesirability of holder distortion in the ordinary tooth, this phenomenon may be used advantageously in the practice of the invention. When the inventive tooth point is placed on a conventional holder or adapter (i.e., one without the box-shaped apex or rear land surfaces for beam bearing or the conforming thrust receiving surfaces), the point will, in short order, develop such surfaces in the adapter to bring about the inventive operation of stress component separation. The preferential wear of the adapter occurs because the adapter is uniformly softer than the point in order to absorb and transmit stress rather than to resist the abrading action of the material being worked.

As pointed out previously, the invention can be utilized advantageously in transmitting forces applied in the so-called minor plane. However, force components in the minor plane are rarely encountered without an appreciable amount of positive thrust, so that conventional wedge-defining or generally triangular faces may be used on the sides of the tooth holders to absorb thrust loading without materially affecting the stability of the tooth resisting force components in the major plane.

In FIG. 10, the tooth point 310 is equipped with the thrust and beam bearing surfaces 318, 319 and 320 analogous to the surfaces 118, 119 and 120 of the FIG. 8 form, but the inclined faces 113 and 114 of the FIGS. 8 and 9 form have been omitted. However, the point 310 is equipped with rear beam bearing surfaces 321 and 322 on the shank 338. Optionally, a collar 340 or a wear cap may be provided on the adapter 311. This has a different wear pattern than the point, so that maximum use of available metal occurs.

In the fabrication of points according to the instant invention, casting may be advantageously employed. However, it is possible also to employ other fabricating techniques, such as forging, welding, etc. The amount of metal employed in the point is limited in comparison to previously provided points. For example, in casting, the socket of the point is developed by a core box molded or contoured of sand. In the past, it has been the practice to contour the core box according to the adapter over which the point was to be mounted. Necessarily, the socket would be slightly larger than the adapter nose to provide the necessary mounting clearance. However, there would be a substantial identity between the dimensions of the socket-providing core box and the adapter nose over which the cast point was ultimately to be mounted. In the practice of the instant invention, the core box is enlarged relative to the adapter nose, principally in the dimensions transverse of the major axis of the point; i.e., those lying in the major plane illustrated. This permits the desirable pivoting action of the point on the adapter nose so as to utilize the various beam bearing surfaces.

It will be appreciated that the adapter nose alternatively may be contoured smaller than a given socket for which it is intended.

More specifically, the fabrication technique can be appreciated from a consideration of FIG. 7. There, the element 10' is the socket member and the mating element 11' is the nose element. The nose element may be the first element designed, having dimensions sufficient to carry all the contemplated loads. It will also be appreciated that ordinarily the nose design is not carried out independently of the point design, since the point initially may have to be of a certain length. This will affect the nose length.

However, assuming the nose contour is determined, patterns are then constructed to duplicate this. Depending upon the fabrication technique to be employed, the pattern is then followed to provide an actual nose element.

At this juncture, the prior art would provide a socket element wherein the socket was just about congruent with the nose. For example, the nose would be made oversize relative to the point cavity and then ground so that fits were obtained, both forwardly and rearwardly on the mating surfaces. Generally, the manufacturer tries to get a perfect mate on at least about 50% of the surfaces involved, especially eliminating any difference in angle between the point socket and nose. In particular, it was attempted to minimize any looseness in fit between the wedge-defining faces 13 and 26, and 14 and 27 (see FIG. 1).

If the point cavity was too big, the holes for the locking pin were out of register, with the pin then not being able to hold the point on the nose. Hence, in the prior art, the standard called for was a fit of 50% surface bearing well distributed, angles matched, with pin hole locations to match within $+\frac{1}{16}''$.

Now, however, the socket is intentionally made larger than the nose, and with no attempted fit as before. In fact, the clearance between the socket wedge faces 13 and 14 and the corresponding nose faces 26 and 27 is made so that these faces cannot engage but rather that the beam bearing surfaces (the approximately horizontal surfaces 19—22 and 28—31) contact preferentially. Also, it is to be noted that corresponding beam bearing surfaces are spaced apart—as in FIG. 6. In other words, FIG. 6 shows the relation of the pattern for the nose and the pattern for the socket when the two are aligned.

This is optimally achieved by limiting the amount of metal used in forming the "coacting" surfaces of either the point or the adapter, or both. It will be appreciated that generally this will mean less overall metal (compared with prior art teeth), since the point outside dimensions will usually be maintained. However, with the same dimensions, the inventive procedure results in a tooth several times stronger or makes possible a longer tooth with the same strength.

In actual practice, teeth made according to the inventive process provide advantageous stress resistance where the beam bearing surfaces providing the apex of the nose or socket, as the case may be, are relatively short, i.e., square projections of the order of approximately ¼″–½″ long. Here, it is to be appreciated that the apex portion can be conveniently designated "square" since it approximates a box shape. For advantageous tooth operation, the box-shaped apex may constitute less than 10–15% of the nose length, and with harder materials of construction, nose projections of 4–5% of the nose length (measured from the tip to the shoulder against which the rear of the point bears) may be employed advantageously.

Teeth provided according to the invention are useful in a variety of ground-working operations. When the teeth are to be used in ripping operations, tremendous forces are encountered in the major plane which are more effectively resisted when the tooth is equipped with the side surfaces of revolution such as are designated by the numeral 36 in FIG. 1. The surface 36, and its counterpart on the hidden side of the tooth in FIG. 1, is generated by rotating an imaginary line about a horizontal axis extending transversely of the length of the tooth. The location of the axis corresponds to the pivot point P and, in the illustration of FIG. 1, lies within the pin or lock structure 17. Where the arcuate surface-generating lines are straight lines, side conical segments will make up the surface 36 and its hidden counterpart. A fuller showing of this development may be seen in our copending application, Serial No. 855,713, and, in a different environment, in U.S. Patent No. 2,919,506, issued January 5, 1960. Through using arcuate surfaces of revolution developed by rotating an imaginary line about a horizontal axis extending transversely of the length of the tooth, full mating contact between the side surfaces on the point and adapter can be realized, irrespective of the relative positions of these two elements. Thus, there results substantially full bearing contact between the outer side surfaces of the adapter and the inner side surfaces of the point socket during relative vertical movement of the point and adapter—as encountered particularly during ripping. As is implicit from what has been said before, the extent of the side surfaces of revolution may be varied. Optimally, the surfaces have an extent less than 90° of arc—this being measured along the edge closest to the axis of generation, it being understood that the side bearing surfaces are defined and flanked by the upper and lower wedge faces 13 and 14 or 26 and 27, as the case may be. We have found it convenient to provide the arcuate side surfaces 36, etc., in the form of conical segments which can be defined as resulting from the revolving of two nonparallel imaginary lines about a single axis of generation.

In practice, we prepare a drawing to show the conical surface 36 (see FIG. 1) to be bounded on the inside (adjacent the pivot point P) by an arc of 180°. However, it is only the central 90° arcuate portion that is essentially effective in contributing resistance to a thrust force P. In other words, the terminal 45° portions on each end of the cone-defining arc provide relatively little resistance to thrust. More importantly, in the manufacturing process, these terminal portions are almost impossible to hold in close enough tolerances to achieve the theoretical minor thrust resistance that they could provide. Hence, we regard the specification of the 90° arcuate portion of the surface of revolution to be primarily significant. In the same vein, it will be appreciated that the surfaces 18 and 23 may be regulated within the preferred range of 20–90°. In the illustration given, the arcuate length of the surface 35 is seen to approximate 60°, which can be varied somewhat depending upon the size of the tongue or ear 32.

Still further, in actual practice, we maintain a discrete spacing between the beam bearing surfaces (for example 19 and 28 of FIG. 5—correspondingly 20 and 29) with the oversize of the socket relative to the box-shaped apex being in the range of $\frac{1}{32}″$ to about $\frac{3}{16}″$. This develops the advantageous rocking action referred to heretofore.

While, in the foregoing specification, we have set forth a detailed description of embodiments of the invention for the purpose of illustration thereof, many changes in the details herein given may be made by those skilled in the art without departing from the spirit and scope of the invention.

We claim:
1. In an excavating tooth comprising a wedge-shaped point defining a digging edge at the forward end, and a point holder, said point being equipped with a generally wedge-shaped socket opening thereinto from the rear end thereof for mounting the point on the holder by movement of said point along a path defining the axis of the thrust component of a force applied to said point, said thrust component axis extending perpendicularly to the axis of the beam component of said force, said socket and holder each having confronting forwardly convergent upper and lower walls defining the wedge shapes thereof, the improvement comprising:
  (A) upper and lower beam bearing surfaces constituting a pair of surfaces in each of said point and holder with each beam bearing surface intersecting its associated convergent wall and located respectively at the apex of said socket and the forward end of said holder,
    (i) said surfaces being substantially parallel to said thrust axis and with said thrust axis lying between the surfaces of each pair,
    (ii) the spacing between the socket surfaces being greater than the spacing between the holder surfaces, and
    (iii) with the convergent walls of said socket at least adjacent said socket beam bearing surfaces being always spaced from the corresponding confronting walls of said holder whereby said point is adapted to rock limitedly on said holder to selectively bring corresponding beam bearing surfaces of said socket and holder into contact, and
  (B) a separate surface on each of said point and holder for primarily transmitting the thrust component of said force.
2. In an excavating tooth comprising a wedge-shaped point defining a digging edge at the forward end, and a point holder, said point being equipped with a generally wedge-shaped socket opening thereinto from the rear end thereof for mounting the point on the holder by movement of said point along a path defining the axis of the thrust component of a force applied to said point, said thrust component axis extending perpendicularly to the axis of the beam component of said force, said socket and holder each having confronting forwardly convergent upper and lower walls defining the wedge shapes thereof, the improvement comprising:
  (A) upper and lower beam bearing surfaces constituting a pair of surfaces in each of said point and holder with each beam bearing surface intersecting its associated convergent wall and located respectively at the apex of said socket and the forward end of said holder,
    (i) said thrust axis lying between the surfaces of each pair, each surface being forwardly convergent relative to said axis not more than about 5°,

(ii) the spacing between the socket surfaces being greater than the spacing between the holder surfaces, and (iii) with the convergent walls of said socket at least adjacent said socket beam bearing surfaces being always spaced from the corresponding confronting walls of said holder whereby said point is adapted to rock limitedly on said holder to selectively bring corresponding beam bearing surfaces of said socket and holder into contact, and (B) a separate surface on each of said point and holder for primarily transmitting the thrust component of said force.

3. In an excavating tooth comprising a wedge-shaped point defining a digging edge at the forward end, and a point holder, said point being equipped with a generally wedge-shaped socket opening thereinto from the rear end thereof for mounting the point on the holder by movement of said point along a path defining the axis of the thrust component of a force applied to said point, said thrust component axis extending perpendicularly to the axis of the beam component of said force, said socket and holder each having confronting forwardly convergent upper and lower walls defining the wedge shapes thereof, the improvement comprising:

(A) upper and lower beam bearing surfaces constituting a pair of surfaces in each of said point and holder with each beam bearing surface intersecting its associated convergent wall and located respectively at the apex of said socket and the forward end of said holder, (i) said surfaces being substantially parallel to said thrust axis and with said thrust axis lying between the surfaces of each pair, (ii) the spacing between the socket surfaces being greater than the spacing between the holder surfaces, and (iii) said point and holder each being equipped with a second pair of beam bearing surfaces spaced longitudinally rearwardly of the first-mentioned pairs of beam bearing surfaces, said second pairs of surfaces being generally parallel to said thrust axis, the spacing between the second pair of surfaces in said point being greater than the spacing between the second pair of surfaces in said holder, said thrust axis lying between the surfaces of each of said second pairs of surfaces, the convergent walls of said socket being always spaced from the corresponding confronting walls of said holder whereby said point is adapted to rock limitedly on said holder to selectively bring corresponding beam bearing surfaces of said socket and holder into contact, and (B) a separate surface on each of said point and holder for primarily transmitting the thrust component of said force.

4. In an excavating tooth comprising a wedge-shaped point defining a digging edge at the forward end, and a point holder, said point being equipped with a generally wedge-shaped socket opening thereinto from the rear end thereof for mounting the point on the holder by movement of said point along a path defining the axis of the thrust component of a force applied to said point, said thrust component axis extending perpendicularly to the axis of the beam component of said force, said socket and holder each having confronting forwardly convergent upper and lower walls defining the wedge shapes thereof, the improvement comprising:

(A) upper and lower beam bearing surfaces constituting a pair of surfaces in each of said point and holder with each beam bearing surface intersecting its associated convergent wall and located respectively at the apex of said socket and the forward end of said holder, (i) said thrust axis lying between the surfaces of each pair, each surface being forwardly convergent relative to said axis not more than about 5°, (ii) the spacing between the socket surfaces being greater than the spacing between the holder surfaces, and (iii) said point and holder each being equipped with a second pair of beam bearing surfaces spaced longitudinally rearwardly of the first-mentioned pairs of beam bearing surfaces, the spacing between the second pair of surfaces in said point being greater than the spacing between the second pair of surfaces in said holder, said axis lying between the surfaces of each of said second pairs of surfaces, the convergent walls of said socket being always spaced from the corresponding confronting walls of said holder whereby said point is adapted to rock limitedly on said holder to selectively bring corresponding beam bearing surfaces of said socket and holder into contact, each of said second pairs of surfaces being forwardly convergent relative to said axis not more than 15°, and (B) a sparate surface on each of said point and holder for primarily transmitting the thrust component of said force.

5. In an excavating tooth comprising a wedge-shaped point element defining a digging edge at one end, and a point holder element, means at the other end of said point element for mounting the point element on the holder element by movement of said point element along a path defining the axis of the thrust component of a force applied to said point element, said thrust component axis extending perpendicularly to the axis of the beam component of said force, one of said elements being equipped with a generally wedge-shaped socket and the other of said elements being equipped with a generally wedge-shaped nose adapted to be received within said socket, the improvement comprising:

(A) a pair of beam bearing surfaces on each of said elements with each surface intersecting its associated wedge shape-defining wall, (i) said surfaces being substantially parallel to said thrust axis with said thrust axis lying between the surfaces of each pair, (ii) the spacing between the surfaces in the socket-equipped element being greater than the spacing between the surfaces of the nose-equipped element, and (iii) with the wedge shape defining walls of said socket at least adjacent the beam bearing surfaces of the socket-equipped element being always spaced from the corresponding wedge shape defining walls of said nose-equipped element whereby said point element is adapted to rock limitedly relative to said holder element to selectively bring corresponding beam bearing surfaces in said point element and holder element into contact, and (B) a separate surface on each of said point element and holder element for primarily transmitting the thrust component of said force.

6. A tooth point, comprising a wedge-shaped body defining a digging edge at one end, a wedge-shaped socket at the other end of said body for mounting the body on a tooth holder by movement of said body along a path defining the axis of the thrust component of a force applied to said body, said thrust component axis extending perpendicularly to the axis of the beam component of said force and defining therewith a force plane, the improvement comprising:

(A) said socket adjacent the apex thereof being equipped with a pair of surfaces adapted to primarily resist the beam component of said force,
(i) said thrust axis lying between said pair of surfaces and
(ii) with said surface being substantially parallel to said thrust axis with each surface intersecting its associated wedge shape-defining wall,
(B) said body being equipped with an additional surface separate from said pair of surfaces, said additional surface being adapted to primarily transmit the thrust component of said force to said holder and
(i) being a surface of revolution to permit limited rotation of said body on said tooth holder about an axis normal to said plane,
(ii) said surface of revolution being a cylindrical segment having an arcuate length of less than about 90°.

7. The structure of claim 6 in which each of said pair of surfaces is forwardly convergent relative to said thrust axis not more than about 5°.

8. The structure of claim 6 in which said body is equipped with a second pair of beam bearing surfaces spaced longitudinally rearwardly of the first-mentioned pair of surfaces, said thrust axis lying between said second pair of surfaces with the second pair of surfaces being spaced apart a distance greater than said first-mentioned pair of surfaces.

9. The structure of claim 8 in which each of said second pair of surfaces is forwardly convergent relative to said axis not more than about 15°.

10. A rocking tooth point for use on a tooth point holder of predetermined size and shape, said tooth point comprising a wedge-shaped body defining a digging edge at one end, a wedge-shaped holder receiving socket at the other end of said body for mounting the body on a tooth holder by movement of said body along a path defining the axis of the thrust component of a force applied to said body, said thrust component axis extending perpendicularly to the axis of the beam component of said force and defining therewith a force plane, the improvement comprising:
(A) said body being equipped with forward and rearward pairs of surfaces adapted to primarily resist the beam component of said force,
(i) said thrust axis lying between said surfaces of each pair,
(ii) said surfaces being substantially parallel to said thrust axis with each forward surface intersecting its adjacent wedge shape-defining wall, and
(iii) said surfaces of each pair being spaced apart a distance sufficiently greater than the spacing of portions of the holder confronted thereby to provide freedom for rocking movement,
(iv) said surfaces limiting the extent of said rocking movement;
(B) said body being equipped with an additional surface separate from said pairs of surfaces, said additional surface being adapted to primarily transmit the thrust component of said force to said holder and
(i) being shaped to accommodate said rocking movement.

11. A rocking tooth point for use on a tooth point holder of predetermined size and shape, said tooth point comprising a wedge-shaped body subjectable to variable forces in use causing said body to rock on its holder, said forces, when oblique to the longitudinal axis of said body, having a thrust component along said axis and a beam component normal to said axis, said body defining
(A) a digging edge at one end,
(B) a wedge-shaped holder-receiving socket at the other end of said body for mounting said body on a holder,
(C) thrust bearing means comprising a surface on said body extending in a transverse direction relative to said axis and so shaped in relation to the shape of the portion of the holder engaged thereby as to accommodate said rocking movement, and
(D) longitudinally spaced pairs of forward and rearward beam bearing means,
(i) said beam bearing means comprising surfaces on said body approximately parallel with said axis arranged to accommodate endwise mounting of said body on a holder each of the forward surfaces intersecting its adjacent wedge shaped-defining wall,
(ii) said surfaces of each pair being spaced apart in a direction transversely of said axis a distance sufficiently greater than the transverse spacing of portions of said holder in confronting relation thereto to provide freedom for said rocking movement,
(iii) said surfaces limiting the extent of said rocking movement.

References Cited in the file of this patent
UNITED STATES PATENTS

| 1,205,969 | Brinton | Nov. 28, 1916 |
| 2,311,463 | Page | Feb. 16, 1943 |
| 2,870,667 | Murtaugh | Jan. 27, 1959 |
| 2,919,506 | Larsen | Jan. 5, 1960 |
| 2,982,035 | Stephenson | May 2, 1961 |
| 2,984,028 | Renner et al. | May 16, 1961 |

FOREIGN PATENTS

| 475,297 | Canada | July 17, 1951 |
| 213,291 | Australia | Feb. 25, 1958 |